(12) United States Patent
Ohkubo et al.

(10) Patent No.: US 9,136,535 B2
(45) Date of Patent: Sep. 15, 2015

(54) CATHODE ACTIVE MATERIAL, CATHODE, SECONDARY BATTERY AND MANUFACTURING METHODS FOR THE SAME

(75) Inventors: Michio Ohkubo, Tokyo (JP); Michihiro Shimada, Tokyo (JP); Naoki Uno, Tokyo (JP); Yosuke Hirayama, Tokyo (JP); Toshio Tani, Tokyo (JP); Hidetoshi Abe, Kanagawa (JP); Miyu Aita, Kanagawa (JP)

(73) Assignees: FURUKAWA ELECTRIC CO., LTD., Tokyo (JP); THE FURUKAWA BATTERY CO., LTD., Kanagawa (JP)

( * ) Notice: Subject to any disclaimer, the term of this patent is extended or adjusted under 35 U.S.C. 154(b) by 470 days.

(21) Appl. No.: 13/598,888

(22) Filed: Aug. 30, 2012

(65) Prior Publication Data

US 2013/0052544 A1 Feb. 28, 2013

Related U.S. Application Data

(63) Continuation of application No. PCT/JP2011/054350, filed on Feb. 25, 2011.

(30) Foreign Application Priority Data

Mar. 1, 2010 (JP) .................................. 2010-044185

(51) Int. Cl.
*H01M 4/58* (2010.01)
*C01B 33/021* (2006.01)
*H01M 10/052* (2010.01)

(52) U.S. Cl.
CPC ........... *H01M 4/5825* (2013.01); *C01B 33/021* (2013.01); *H01M 10/052* (2013.01); *Y02E 60/122* (2013.01); *Y02T 10/7011* (2013.01)

(58) Field of Classification Search
CPC .... C01B 33/163; C01B 33/142; C01B 33/20; C01B 33/22; C01B 33/24; C01B 33/26; C01B 39/08; H01M 4/0471
See application file for complete search history.

(56) References Cited

U.S. PATENT DOCUMENTS 7,824,643 B2 * 11/2010 Schumacher et al. ........ 423/335
2009/0123813 A1 * 5/2009 Chiang et al. .................. 429/50

(Continued)

FOREIGN PATENT DOCUMENTS

CN 101641814 A 2/2010
JP 11144762 A 5/1999

(Continued)

OTHER PUBLICATIONS

JP 2009170401 A English Machine Translation.*

(Continued)

*Primary Examiner* — Ula C. Ruddock
*Assistant Examiner* — Scott J Chmielecki
(74) *Attorney, Agent, or Firm* — Lowe Hauptman & Ham, LLP (57) ABSTRACT

An object of the present invention is to provide a cathode active material which contains small-particle sized and low-crystalline lithium transition metal silicate and which undergoes charge-discharge reaction at room temperature.
The cathode active material for a non-aqueous electrolyte secondary battery is characterized by containing a lithium transition metal silicate and exhibits diffraction peaks having half widths of 0.175 to 0.6°, the peaks observed through powder X-ray diffractometry within a $2\theta$ range of 5 to 50°.

10 Claims, 5 Drawing Sheets

(56) References Cited

U.S. PATENT DOCUMENTS

| | | | | |
|---|---|---|---|---|
| 2011/0269022 A1* | 11/2011 | Kawakami et al. | ............ | 429/221 |
| 2011/0291055 A1* | 12/2011 | Kojima et al. | ................ | 252/506 |
| 2013/0052529 A1* | 2/2013 | Ohkubo et al. | ................ | 429/211 |

FOREIGN PATENT DOCUMENTS

| | | | |
|---|---|---|---|
| JP | 2001266882 A | | 9/2001 |
| JP | 2007335325 A | | 12/2007 |
| JP | 2009104794 A | | 5/2009 |
| JP | 2009170401 A | * | 7/2009 |
| JP | 2011076793 A | | 4/2011 |
| WO | 2008107571 A2 | | 9/2008 |
| WO | 2010089931 A1 | | 8/2010 |

OTHER PUBLICATIONS

Miki Yasutomi et al. "Synthesis and Electrochecmical Properties of Li2-xM(SiO4)1-x(PO4)x(M = Fe, Mn) Positive Active Materials by Hydrothermal Process for Li-ion Cells", GS Yuasa Technical Report, GS Yuasa Corporation, Jun. 26, 2006, vol. 6, No. 1, pp. 21-26.

R Dominko "Li2MSiO4 (M=Fe and/or Mn) cathode materials", Journal of Power Sources, Mar. 2008, vol. 184, pp. 462-468.

International Search Report for PCT/JP2011/054350, dated May 17, 2011.

Office Action corresponding to JP 2010-044185, dated Jan. 21, 2013.

Wengang Liu et al., "Synthesis, characterization and electrochemical performance of Li2MnSiO4/C cathode material by solid-state reaction", Journal of Alloys and Compounds 480 (2009) L1-L4.

Office Action mailed Jun. 4, 2014, corresponding to Chinese patent application No. 201180011342.8.

R. Dominko et al., Structure and electrochemical performance of Li2MnSio4 and Li2FeSiO4 as potential Li-battery cathode materials, Electrochemistry Communication, vol. 8, Issue. 2, pp. 217-222.

Taewon Lee et al., Electrochemical characteristics of LiCoO2 nanopowder synthesized via aerosol flame deposition (AFD), Journal of Physics and Chemistry of Solids, vol. 69, Issue. 5-6, pp. 1242-1245.

\* cited by examiner

CATHODE ACTIVE MATERIAL, CATHODE, SECONDARY BATTERY AND MANUFACTURING METHODS FOR THE SAME

RELATED APPLICATIONS

The present application a continuation of PCT/JP2011/054350, filed Feb. 25, 2011 and is based on, and claims priority from Japanese Application Number 2010-044185, filed Mar. 1, 2010, the disclosure of which is hereby incorporated by reference herein in its entirety.

TECHNICAL FIELD

The present invention relates to a particulate mixture which contains amorphous or low-crystalline lithium transition metal silicate and which serves as a precursor for a cathode active material of non-aqueous electrolyte secondary batteries.

BACKGROUND ART

In recent years, secondary batteries have been important power source parts in advanced-function mobile electronic devices. Among such secondary batteries, Li ion secondary batteries, which provide high energy density by virtue of high voltage attained by an appropriate combination of a cathode active material and an anode active material, have replaced conventional NiCd cells and Ni hydrogen cells and now predominantly serve as secondary batteries. However, Li ion secondary batteries containing, in combination, a lithium cobaltate ($LiCoO_2$) cathode active material and a carbon-based anode active material (mainly graphite), the combination being typically employed in current Li ion batteries, cannot provide sufficient consumption power for recent advanced-function and high-load electronic parts. Thus, such Li ion secondary batteries fail to attain performance required of power sources in mobile devices.

Generally, the theoretical electrochemical specific capacity of cathode active material is low. In addition to lithium cobaltate, currently employed lithium manganate and lithium nickelate and lithium iron phosphate, whose practical use is now under investigation, attain a specific capacity lower than the theoretical specific capacity of current carbon-based anode active material. Meanwhile, the performance of the carbon-based anode active material has been enhanced year by year, and the specific capacity thereof becomes nearly equivalent to the theoretical specific capacity. Therefore, the combination of a current cathode active material and a current anode active material is not expected to attain drastic enhancement in power capacity. Thus, current cathode active materials have a limitation in relation to meeting further demand for adding higher functions in electronic device and long-term operation of mobile devices and to adaptation to industrial uses (e.g., electric tools, uninterruptible power sources, and electrical storage devices) and electric vehicles.

Under such circumstances, replacement of a carbon (C)-based anode active material by a metallic anode active material is studied for drastically increasing electric capacity from the currently attained level. Specifically, an anode active material containing a germanium (Ge) substance, a tin (Sn) substance, or a silicon (Si) substance is used, the material having a theoretical specific capacity which is several times to ten times that of a currently utilized carbon-based anode active material. Particularly, Si is most intensively studied, since Si has a specific capacity equivalent to that of metallic Li, which is thought to be difficult to use in practice.

However, since the cathode active material has low specific capacity, the high theoretical specific capacity of Si is not fully utilized for producing actual batteries. A layered or tunnel-form complex oxide, which is currently studied for practical use as a cathode active material and which can serve as a Li intercalation host, has a theoretical specific capacity (per unit mass) capacity slightly higher than 150 mAh/g, which is ½ or less the specific capacity of a current carbon-based anode active material and ¹⁄₂₀ or less the theoretical specific capacity of Si. Therefore, studies must be conducted on a material system for increasing the capacity of cathode active material. One candidate for a new cathode active material is a lithium transition metal silicate compound, which is expected to provide a capacity higher than 300 mAh/g (twice current level) by employing a certain component, and studies thereof have started (see, for example, Patent Document 1 and Non-Patent Document 1).

RELATED ART DOCUMENTS

Patent Documents

Patent Document 1: JP-A-2001-266882

Non-Patent Documents

Non-Patent Document 1: Miki YASUTOMI and four others, "Synthesis and Electrochemical Properties of $Li_{2-x}M(SiO_4)_{1-x}(PO_4)_x$ (M=Fe, Mn) Positive Active Materials by Hydrothermal Process for Li-ion Cells" GS Yuasa Technical Report, GS Yuasa Corporation, Vol. 6, No. 1, p. 21-26 (Jun. 26, 2009)

SUMMARY OF THE INVENTION

Problems to be Solved by the Invention

In previous studies on lithium transition metal silicate compounds, high electrochemical specific capacity failed to be attained, and no cell charge-discharge reaction occurred under generally employed room temperature conditions. Non-Patent Document 1 discloses that charge-discharge reaction occurs only at elevated temperature.

The present inventors have conducted extensive studies on conventionally employed cathode active materials in comparison with conventional lithium transition metal silicate compounds. As a result, the inventors have found that a conventional lithium transition metal silicate compound, having a large crystal grain size, is not suitably employed as a Li ion intercalation host, even when the lithium transition metal silicate compound, which is quasi-insulating, is used with a conductivity-imparting agent for imparting conductivity to the compound or when the compound is supported by or coated with a conductive substance.

Means for Solving the Problems

The present invention has been conceived in view of the aforementioned problems. Thus, an object of the present invention is to provide a cathode active material which contains small-particle sized and low-crystalline lithium transition metal silicate and which is able to charge and discharge at room temperature.

Accordingly, the present invention provides the following.
(1) A cathode active material for a non-aqueous electrolyte secondary battery, characterized in that the material comprises a lithium transition metal silicate and exhibits diffraction peaks having half widths of 0.175 to 0.6°, the peaks being observed through powder X-ray diffractometry within a 2θ range of 5 to 50°.
(2) A cathode active material for a non-aqueous electrolyte secondary battery, characterized in that the material comprises a lithium transition metal silicate and has a crystallite size of 5 to 50 nm, the crystallite size being determined through powder X-ray diffractometry within a 2θ range of 5 to 50°.
(3) A cathode active material as described in (1) or (2) above, which has a particle size, as determined by a transmission electron microscopic image, of 10 to 200 nm and a mean particle size of 25 to 100 nm.
(4) A cathode active material as described in (1) or (2) above, which is in a microcrystalline state in which crystals thereof at least partially coated with an amorphous component are present.
(5) A cathode active material as described in (1) or (2) above, which has a generally spherical particle form.
(6) A cathode active material as described in (1) or (2) above, wherein the material is at least partially coated with carbon, or carbon is deposited on at least a part of the surface thereof.
(7) A cathode active material as described in (1) or (2) above, wherein transition metal of the lithium transition metal silicate includes at least two elements selected from among Fe, Mn, Ti, Cr, V, Ni, Co, Cu, Zn, Al, Ge, Zr, Mo, and W.
(8) A cathode active material as described in (1) or (2) above, wherein the silicate of the lithium transition metal silicate is partially substituted by phosphoric acid anion, boric acid anion or a metallic acid anion which does not release oxygen.
(9) A cathode for a non-aqueous electrolyte secondary battery, characterized by comprising a collector and a cathode active material layer containing a cathode active material as recited in (1) or (2) above and formed on at least one surface of the collector.
(10) A non-aqueous electrolyte secondary battery cathode as described in (9) above, wherein the collector is an aluminum-containing foil, and the interface between the collector and the cathode active material layer includes a hybrid interface region in which at least one element forming the collector diffuses into the cathode active material layer.
(11) A non-aqueous electrolyte secondary battery cathode as described in (10) above, wherein at least the region of the collector on which the cathode active material layer is formed has a surface roughness Rz which is ten-point height of irregularities defined by JIS B0601-1994 of 0.5 μm or more.
(12) A non-aqueous electrolyte secondary battery, characterized by comprising a non-aqueous electrolyte secondary battery cathode as recited in (9) above.
(13) A non-aqueous electrolyte secondary battery as described in (12), wherein the electrolyte comprises non-aqueous solvent containing fluorine.
(14) A method for producing a lithium transition metal silicate cathode active material, characterized in that the method comprises:
supplying a lithium source, a transition metal source, a silicon source, and pure water to a reactor;
treating the mixture at 150 to 400° C. in the sealed pressure reactor, to thereby synthesize a cathode active material;
heating the cathode active material at 300 to 900° C. for 0.5 to 10 hours, to thereby produce an aggregated active material; and
pulverizing the aggregated active material, to thereby produce a lithium transition metal silicate cathode active material,
wherein the lithium transition metal silicate cathode active material exhibits diffraction peaks having half widths of 0.175 to 0.6°, the peaks being observed through powder X-ray diffractometry within a 2θ range of 5 to 50°, or has a crystallite size of 5 to 50 nm, the crystallite size being determined through powder X-ray diffractometry within a 2θ range of 5 to 50°.
(15) A method for producing a lithium transition metal silicate cathode active material, characterized in that the method comprises:
supplying a lithium source, a transition metal source, a silicon source, and pure water into flame in a reactor, to thereby synthesize an active material precursor;
heating the active material precursor at 300 to 900° C. for 0.5 to 10 hours, to thereby produce an aggregated active material; and
pulverizing the aggregated active material.
(16) A cathode active material production method as described in (15) above, wherein the flame is an oxygen-hydrogen flame, and the reactor is filled with an inert gas.
(17) A cathode active material production method as described in (15) above, wherein the flame is an oxygen-containing hydrocarbon flame, and the reactor is filled with an inert gas.
(18) A cathode active material production method as described in (15) above, wherein the lithium source, the transition metal source, and the silicon source supplied into the flame is a chloride, and the source of the flame contains at least hydrogen gas and oxygen gas.
(19) A cathode active material production method as described in (15) above, wherein the lithium source, the transition metal source, and the silicon source are supplied into the flame in the gas form, or in the liquid or solution form which has been caused to pass through a vaporizer before the supply.
(20) A cathode active material production method as described in (14) or (15) above, wherein heating is performed in the presence of an additional carbon source in the production of the aggregated active material.
(21) A cathode active material production method as described in (14) or (15) above, wherein the aggregated active material is porous and has a pore size, as observed on the surface thereof, of 0.01 to 0.6 μm.
(22) A method for producing a cathode for a non-aqueous electrolyte secondary battery, characterized in that the method comprises applying, onto a collector, slurry containing a cathode active material which has been produced through a cathode active material production method as recited in (14) or (15) above.
(23) A non-aqueous electrolyte secondary battery cathode production method as described in (22) above, wherein the slurry contains secondary particles formed through granulation of the cathode active material and having a particle size of 0.5 to 20 μm.

Effects of the Invention

According to the present invention, there can be provided a cathode active material which contains small-particle sized and low-crystalline lithium transition metal silicate and which is able to charge and discharge at room temperature.

In addition, by use of the cathode active material of the present invention, Li ion diffusivity and electron conductivity of the particles of the active material itself are enhanced. As a result, deintercalation and intercalation of Li ions are facilitated, thereby producing a lithium transition metal silicate compound which attains charge and discharge at room temperature. The present invention provides a base for future attainment of intrinsically high charge and discharge capacity of the lithium transition metal silicate compound.

As compared with conventional cathode active materials, the cathode active material of the present invention exhibits a larger diffraction peak half width in X-ray diffractometry and has a smaller crystallite size or particle size. Therefore, short conduction paths for Li ions and electrons are provided in single crystal particles and polycrystalline particles, to thereby attain excellent ion conductivity and electron conductivity, whereby the barrier of charge-discharge reaction can be lowered. Further, when a conducting aid or conducting carbon is applied onto or deposited on the cathode active material, electrical conductivity and macroscopic collecting property over conduction paths and the collector are enhanced, thereby producing a lithium transition metal silicate compound which allows charge and discharge under low-temperature conditions (e.g., at room temperature).

Another characteristic feature of the cathode active material of the present invention resides in that the material is in a microcrystalline state in which crystals thereof at least partially coated with an amorphous component are present, which differs from a feature of a conventional cathode active material. The aforementioned cathode active material cannot be produced through a typically employed solid phase method. Instead, in one possible procedure, raw materials of the cathode active material are simultaneously supplied into a same reaction system, and the raw materials are allowed to react in flame, to thereby mainly form an amorphous active material precursor, and the precursor is heated. Through this production procedure, a porous aggregated active material can be readily formed. Through finely pulverizing the formed aggregated active material, there can be produced a cathode active material of uniform quality having a small particle size in the form of generally spherical particulate. Thus, secondary particles thereof, which can readily be applied onto a collector, can be produced, to thereby produce a cathode active material layer which has excellent adhesion property to the collector and the cathode active material and in which a collector component diffuses. In the case where the cathode active material of the present invention contains a lithium transition metal silicate compound including a plurality of transition metals which result in 2-electron reaction in charge-discharge reaction, a higher capacity can be attained. In addition, since the silicate compound does not release oxygen, ignition and combustion are prevented even under high-temperature conditions, whereby a safe secondary battery can be provided.

MODES FOR CARRYING OUT THE INVENTION

Preferred embodiments of the particulate mixture and cathode active material according to the present invention will next be described. However, the present invention is not limited to the embodiments.

The cathode active material of the present invention is provided as powder material. Alternatively, the cathode active material is provided as slurry containing, in an aqueous solvent or an organic solvent, the powder material as it is or size-increased secondary particles produced therefrom through granulation, along with a dispersing agent and a thickener, a conducting material, etc. in specific amounts. The invention also provides a film like electrode formed by applying the slurry on the collector substrate, to thereby form a cathode active material film. The secondary battery provided by the present invention is fabricated from the secondary battery cathode of the present invention and other known members such as an anode, a separator, and an electrolyte.

The cathode active material of the present invention is synthesized by supplying raw materials to a same reaction system and subsequently heating them, to thereby synthesize an active material precursor or an active material. The particulate mixture serving as an active material precursor is synthesized through a flame method such as flame hydrolysis or thermal oxidation, and the active material is synthesized through hydrothermal synthesis.

(Method for Producing Particulate Mixture Through Flame Method)

In the flame method, raw material like chloride gases, or raw material liquids which have been passed through a vaporizer are supplied into flame, thereby allowing the raw materials to react, whereby a substance of interest is produced. Examples of suitable flame methods include vapor-phase axial deposition (VAD).

In the flame hydrolysis method, raw materials are hydrolyzed in flame. In flame hydrolysis, oxygen-hydrogen flame is generally employed as the flame. In one specific procedure, raw materials of the cathode active material are supplied into flame to which hydrogen gas and oxygen gas are fed, to thereby synthesize a substance of interest. In another specific procedure, the raw materials and flame sources such as oxygen gas and hydrogen gas are simultaneously fed through a nozzle, to thereby synthesize a substance of interest. Through the flame hydrolysis method, a nano-scale amorphous particulate of the substance of interest mostly can be formed in an inert gas atmosphere.

In the thermal oxidation method, raw materials are thermally oxidized in flame. In thermal oxidation, hydrocarbon flame is generally employed as the flame. In one specific procedure, raw materials are supplied into flame to which hydrocarbon gas (e.g., propane gas) and oxygen gas are fed, to thereby synthesize a substance of interest. In another specific procedure, the raw materials and flame sources (i.e., propane gas and oxygen gas) are simultaneously fed through a nozzle, to thereby synthesize a substance of interest.

The raw materials for producing the particulate mixture of the present invention are a lithium source, a transition metal source, and a silicon source. In one embodiment, lithium chloride is used as a lithium source, a transition metal chloride is used as a transition metal source, and silicon tetrachloride is used as a silicon source in the form of gas, liquid, or solution. In the case of solid, the source is dissolved in a solvent, and the solution is caused to pass through a vaporizer before being supplied to flame. In the case of solution, the source solution may be caused to pass through a vaporizer, and the vapor pressure of the source vapor may be increased through heating, pressure reduction, or bubbling, before supply to a feeding nozzle.

Examples of the lithium source which may be used in the invention include lithium inorganic acid salts such as lithium chloride, lithium hydroxide, lithium carbonate, lithium nitrate, lithium bromide, lithium phosphate, and lithium sulfate; lithium organic salts such as lithium oxalate, lithium acetate, and lithium naphthenate; organic lithium compounds such as lithium alkoxides (e.g., lithium ethoxide) and β-diketonatolithium compounds; lithium oxide; and lithium peroxide. The "naphthenic acid" is a mixture of carboxylic acids derived mainly from a plurality of acidic substances contained in petroleum, with predominant ingredients being cyclopentanecarboxylic acid and cyclohexanecarboxylic acid.

Examples of the transition metal source which may be used in the invention include transition metal chlorides such as ferric chloride, manganese chloride, titanium tetrachloride, and vanadium chloride; transition metal oxalates such as iron oxalate and manganese oxalate; transition metal acetates such as manganese acetate; transition metal sulfates such as ferrous sulfate and manganese sulfate; transition metal nitrates such as manganese nitrate; transition metal hydroxides such as manganese oxyhydroxide and nickel hydroxide; transition metal ethylhexanoates such as ferric 2-ethylhexanoate and manganese 2-ethylhexanoate; tetra(2-ethylhexyl) titanate; transition metal naphthenates such as iron naphthenate, manganese naphthenate, chromium naphthenate, zinc naphthenate, zirconium naphthenate, and cobalt naphthenate; transition metal hexoates such as manganese hexoate; transition metal cyclopentadienyl compounds; and transition metal alkoxides such as titanium tetraisopropoxide (TTIP) and titanium alkoxide. Under certain conditions, there may be used transition metal salts of organic acid such as stearic acid, dimethyldithiocarbamic acid, acetylacetonate, oleic acid, linoleic acid, or linolenic acid; and transition metal oxides such as iron oxide and manganese oxide.

As mentioned hereinbelow, in the case where two or more transition metals are employed in the lithium transition metal silicate compound, two or more transition metal sources are supplied into flame.

Examples of the silicon source which may be used in the invention include silicon tetrachloride, octamethylcyclotetrasiloxane (OMCTS), silicon dioxide, silicon monoxide, or hydrates thereof, condensed silicic acids such as orthosilicic acid, metasilisic acid, metadisilisic acid, tetraethyl orthosilicate (tetraethoxysilane, TEOS), tetramethyl orthosilicate (tetramethoxysilane, TMOS), methyltrimethoxysilane (MTMS), methyltriethoxysilane (MTES), hexamethyldisiloxane (HMDSO), tetramethyldisiloxane (TMDSO), tetramethylcyclotetrasiloxane (TMCTS), octamethylcyclotetrasiloxane (OMCTS), octamethyltrisiloxane (OMTSO), and tetra-n-butoxysilane.

In the case where the silicate of the lithium transition metal silicate compound is partially substituted by another anion, a transition metal oxide, a phosphoric acid source, and a boric acid source are added as anion sources.

Specific examples include titanium oxide, titanous acid metal salts (e.g., iron titanite and manganese titanite), titanate salts (e.g., zinc titanate, magnesium titanate, and barium titanate), vanadium oxide, ammonium metavanadate, chromium oxide, chromate salts and dichromate salts, manganese oxide, permanganate salts and manganate salts, cobaltate salts, zirconium oxide, zirconate salts, molybdenum oxide, molybdate salts, tungsten oxide, tungstate salts, phosphoric acids (e.g., orthophosphoric acid and metaphosphoric acid), pyrophosphoric acid, ammonium hydrogenphosphates (e.g., diammonium hydrogenphosphate and ammonium dihydrogenphosphate), phosphate salts and pyrophosphate salts (e.g., ammonium phosphate and sodium phosphate), transition metal (source) phosphates (e.g., ferrous phosphate), boric acid and diboron trioxide, and borate salts (e.g., sodium metaborate, sodium tetraborate, and borax). Any of these anion sources may be used in accordance with the synthesis conditions.

These raw materials and flame sources are supplied to a same reaction system, to thereby synthesize a particulate mixture. The thus-formed particulate mixture may be recovered from exhaust gas by means of a filter. Alternatively, the particulate mixture may be formed on the surface of a rod in the following manner. Specifically, a rod made of silica or silicon so called a seed rod is placed in a reactor, and an oxygen-hydrogen flame or propane flame is applied to the rod. A lithium source, a transition metal source, and a silicon source are fed into the flame with flame sources, and the material sources are subjected to hydrolysis or oxidation, whereby generally nano-scale microparticles are deposited on the surface of the seed rod. The thus-formed microparticles are recovered and, if required, caused to pass through a filter or a sieve to remove impurities and coarse aggregates. The thus-obtained particulate mixture has a nano-scale particle size and is predominantly formed of amorphous microparticles.

The flame method, which is a specific embodiment of the method for producing a particulate mixture of the present invention, provides a particulate mixture formed of amorphous particles having a small particle size. In addition, through the flame method, the particulate mixture can be synthesized on a large scale within a short period of time, as compared with conventional hydrothermal synthesis and solid phase synthesis. Thus, a uniform particulate mixture can be produced at low cost.

(Characteristics of Particulate Mixture Produced Through Flame Method)

The particulate mixture is predominantly formed of oxides of lithium, a transition metal, and silicon, and lithium transition metal silicate amorphous microparticles. In many cases, the particulate mixture crystalline contains transition metal oxides formed therein and further contains a crystalline component of a lithium transition metal silicate compound as one component. When the particulate mixture is subjected to powder X-ray diffractometry within a 2θ range of 10 to 50°, at least two peaks are observed at about 33.1° and about 35.7°. Mostly, the diffraction peaks indicate small and wide diffraction angle. These diffraction peaks are thought to be attributed to crystal faces of the lithium transition metal silicate compound in the forms of small crystallite microparticles, polycrystalline microparticles formed of small single crystals, or microcrystalline forms in which microparticles thereof are surrounded by an amorphous component. Notably, the peak angles may have a possibility to be shifted about ±0.1° to about ±0.2° due to crystal strain or error in measurements.

In the X-ray diffractometry of the aforementioned particulate mixture, a low diffraction peak is observed at least within any of the 2θ ranges of 18 to 20°, 26 to 28°, 30 to 32°, 38 to 40°, and 42 to 44°. These peaks are attributed to silicon oxide, a transition metal oxide, and a lithium transition metal silicate, respectively. In other words, the particulate mixture according to the present invention contains amorphous microparticles of silicon oxide, an amorphous transition metal oxide, and microcrystalline or amorphous lithium transition metal silicate microparticles. In the present invention, the term "amorphous" corresponds to a crystallite size of about 100 nm or less. Whether or not a component is amorphous can be determined by applying the Scherrer's equation a half width of an X-ray diffraction peak observed in a diffraction pattern.

Microcrystals of the lithium transition metal silicate present in the thus-produced particulate mixture contain a lithium transition metal silicate compound represented by $Li_2MSiO_4$, wherein M represents at least one transition metal selected from the group consisting of Fe, Mn, Ti, Cr, V, Ni, Co, Cu, Zn, Al, Ge, Zr, Mo, and W.

(Synthesis of Active Material Through Hydrothermal Synthesis)

In hydrothermal synthesis, water, a lithium source, a transition metal source, and a silicon source are placed in a pressure container such as an autoclave, and the mixture is treated under critical or super-critical conditions (medium temperature (about 100 to about 400° C.) and high pressure) for about 0.1 hours to about 3 days, whereby microparticles of a compound of interest can be synthesized. Notably, since the thus-formed particles have a tendency to aggregate, care must be taken to prevent coarsening of secondary particles. The thus-formed microparticles are recovered through filtration and optionally treated with a filter or a sieve, to thereby yield an active material. The pressure at the reaction in hydrothermal synthesis, which varies depending on the temperature, the type and amounts of raw materials fed to the reactor, and the processing time of the reaction and which cannot be determined equivocally, is about 0.05 to about 100 MPa.

In the case where the silicate of the lithium transition metal silicate compound is partially substituted by another anion, a transition metal oxide, a phosphoric acid source, or a boric acid source is added as an anion source.

The same materials as those employed in the flame method are applicable for the lithium source, transition metal source, and silicon source in hydrothermal synthesis method.

(Production of Aggregated Active Material)

The aggregated active material is produced through heating the particulate mixture obtained from the flame method, or heating the active material obtained from hydrothermal synthesis method. Through heating, amorphous compounds and an oxide mixture present in the particulate mixture or the active material are generally transformed into compounds having a lithium transition metal silicate crystal type. Then, in order to enhance the electrical conductivity of the thermally treated product, an organic compound serving as a conductive carbon source, such as polyvinyl alcohol, sucrose, or carbon black, is added to the aggregated active material obtained from heating, and the mixture of them is baked again. Alternatively, a conductive carbon source may be added to the particulate mixture or the active material during the first heating process, whereby crystallization and carbon coating or deposition treatment are simultaneously performed in a single calcination step. When heating is performed under conditions from 300 to 900° C. as a heating temperature and 0.5 to 10 hours of heating time, a baked product having an appropriate crystallinity and particle size of interest can be yielded. An excessive thermal load due to heating at high temperature or for a long period of time should be avoided, since coarse single crystals may form. Thus, preferably, heating is performed under such conditions that a crystalline or microcrystalline lithium transition metal silicate compound of interest is formed, and the crystallite size can be minimized.

Figure 1:
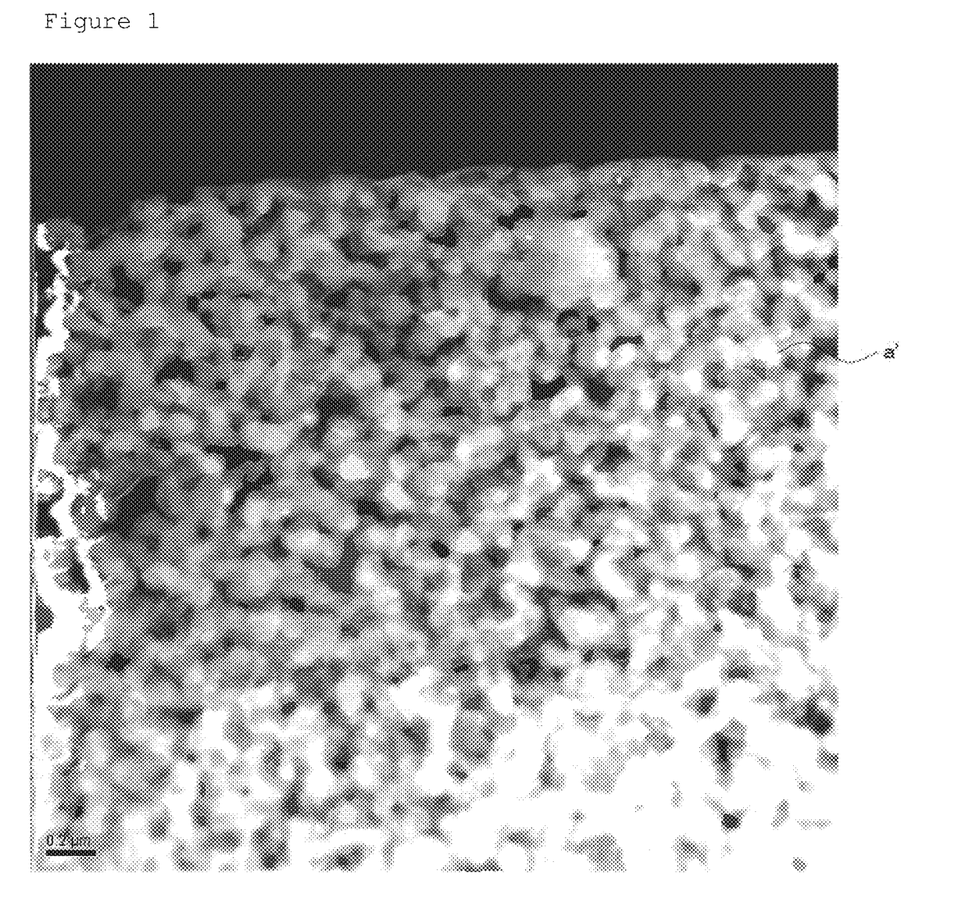
FIG. 1 A SEM image of aggregated active material a' of the present invention.
Figure 2:
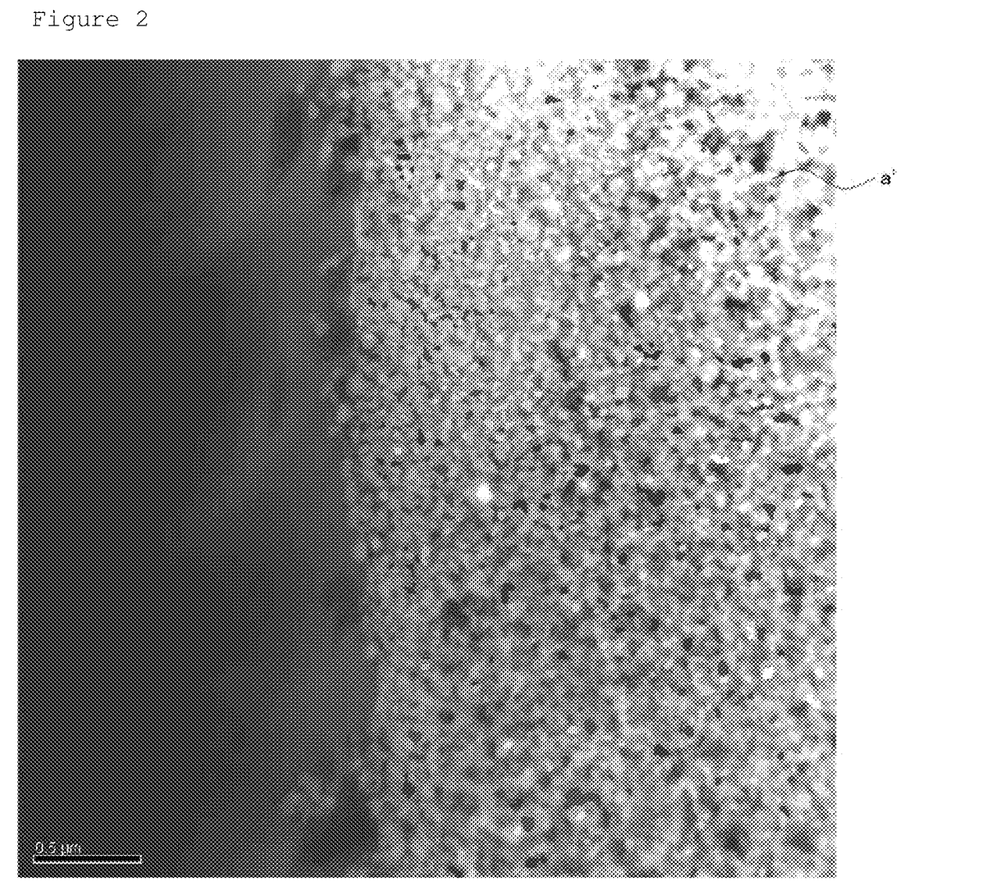
FIG. 2 Another SEM image of aggregated active material a' of the present invention.

Thus, a porous aggregated active material of the present invention as shown in FIGS. 1 and 2 can be produced. The porosity rate and voidage (percent volume taken by void) of the porous aggregated active material varies depending on the raw materials used, particularly on the type of the transition metal element and the transition metal element content. For example, when the transition metal is iron, the pore size and voidage are relatively large, and the formed aggregated material includes 3-dimensional form of void and has also 3-dimensional form, whereas when the transition metal is manganese, the pore size and voidage are relatively small, and the formed aggregated material includes a large number of small pores having a specifically localized distribution therein. The pore size of the aggregated active material of the present invention, which can be determined through observation of the surface of the material under an electron microscope, is generally about 0.01 to about 0.6 µm.

(Production of Cathode Active Material)

Figure 3:
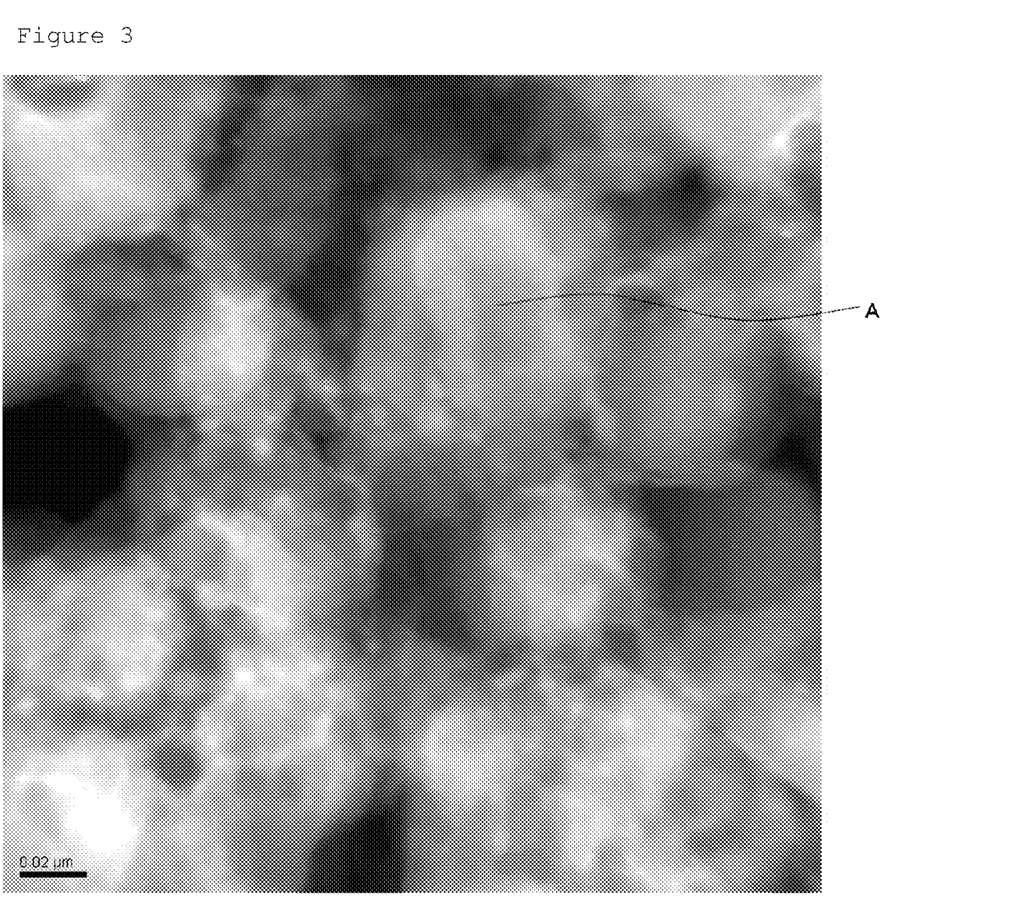
FIG. 3 A TEM image of the cathode active material A of the present invention.
Figure 4:
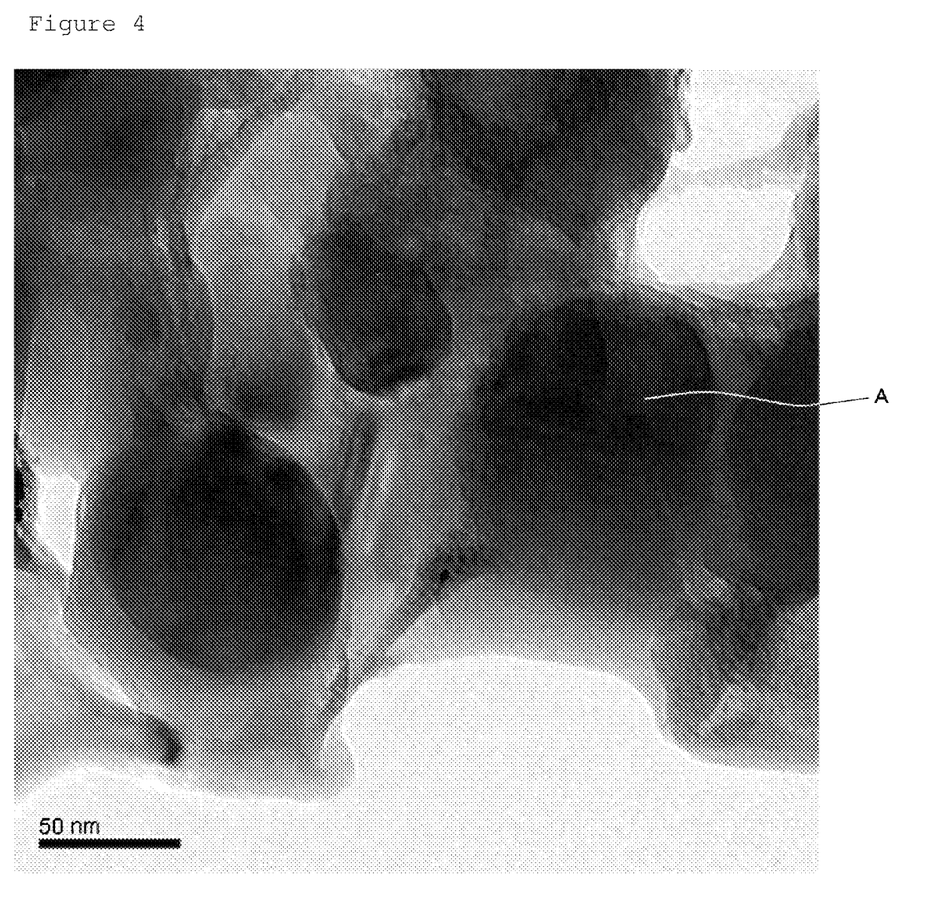
FIG. 4 Another TEM image of the cathode active material A of the present invention.

Subsequently, when the thus-produced aggregated active material is treated by pulverization means (e.g., a mortar or a ball mill), the aggregated form can be transformed again into microparticles. For example, as shown in FIGS. 3 and 4, the cathode active material of the present invention which can serve as a Li ion intercalation host is produced.

When the cathode active material is subjected to powder X-ray diffractometry within a 2θ range of 10 to 50°, at least two peaks are observed at about 33.1° and about 35.7°. The diffraction peaks are attributable to a crystalline lithium transition metal silicate compound. Although the crystalline lithium transition metal silicate compound contained in the cathode active material is generally formed of microcrystals, the compound is partially in a "microcrystalline" state containing an amorphous component. The "microcrystalline" state refers, for example, to a state in which microcrystals, each being formed of a plurality of crystallites, are coated with an amorphous component; a state in which an amorphous component matrix contains microcrystals; or a state in which an amorphous component is present around and between microparticles. These states correspond to the TEM images shown in FIGS. 3 and 4.

In the X-ray diffractometry of the aforementioned cathode active material within a 2θ range of 10 to 50°, a diffraction peak is observed at least in any of one of the 2θ ranges of 18 to 20°, 26 to 28°, 30 to 32°, 38 to 40°, and 42 to 44°. These peaks are attributed to amorphous or crystalline silicon oxide, an amorphous or crystalline transition metal oxide, and a microcrystalline, crystalline, or amorphous lithium transition metal silicate.

The cathode active material of the present invention exhibits a diffraction peak having a minimum half width of 0.175° or more, the peak being observed through powder X-ray diffractometry within a 2θ range of 5 to 50°. As the half width of an X-ray diffraction peak decreases, the crystallite size to be determined increases. That is, as the half width increases, the crystallite size decreases. When the crystallite size becomes smaller, the number of diffraction grating in single crystallite decreases. In this case, the number of slits completely satisfying the Bragg condition at a specific diffraction angle decreases. Thus, broadening in incident X-ray, diffraction line, and half width is observed. Therefore, the requirement of the present invention that a plurality of diffraction peaks have a minimum half width of 0.175° or more means that the crystallite size of the cathode active material of the present invention is smaller than a predetermined value. Namely, according to the present invention, a low-crystallinity lithium transition metal silicate of interest can be produced.

Notably, a plurality of diffraction peaks preferably have a maximum half width of 0.6° or less. Conceivably, difficulty is encountered in producing an excessively low-crystallinity lithium transition metal silicate, and such low crystallinity reduces the lithium intercalation hosts in the crystals, and possibly causes a drop in charge-discharge capacity to be considered.

When the cathode active material of the present invention is analyzed through X-ray diffractometry within a 2θ range of 5 to 50°, the crystallite size being determined through the analysis is 5 to 50 nm. The term "crystallite" refers to a group observed as a single crystal. Generally, a single particle is formed of a plurality of crystallites. Since the cathode active material of the present invention has a small crystallite size, the cathode active material has a low crystallinity which is suitable in the present invention.

When the particle size of the cathode active material of the present invention is determined through observation under a transmission electron microscope (TEM), the particle size is distributed within a range of 10 to 200 nm, and the mean particle size is found to be 25 to 100 nm. Each of the particles is formed of a plurality of crystallites. Preferably, the particle size is distributed within a range of 10 to 150 nm, more preferably 10 to 145 nm, and the mean particle size is 25 to 81 nm. A particle size distribution ranging from 10 to 200 nm does not necessarily mean that the particle size completely falls within the range, and also means that the lower limit of the particle size distribution may be 10 nm or more, and the upper limit thereof may be 200 nm or less. That is, the determined particle size may fall within a range of 10 to 100 nm or 50 to 150 nm.

Since the cathode active material of the present invention has a small particle size, condition paths of Li ions or electrons in single crystals and polycrystalline particles are short, providing excellent ion conductivity and electron conductivity, whereby the barrier of charge-discharge reaction can be lowered.

The cathode active material of the present invention is in a microcrystalline state in which crystals thereof at least partially coated with an amorphous component are present. The "microcrystalline" state refers, for example, to a state in which microcrystals, each being formed of a plurality of crystallites, are coated with an amorphous component; a state in which an amorphous component matrix contains microcrystals; or a state in which an amorphous component is present around and between microparticles. These states correspond to the TEM images shown in FIGS. 3 and 4.

As shown in FIGS. 3 and 4, the cathode active material of the present invention is formed of particles of a generally spherical shape having some edged portions. The term "generally spherical" of a particle refers not to a geometrically perfect shape (e.g., spherical or elliptic) but to a quasi-spherical shape with a generally smooth surface having some angular portions or protrusions.

The thus-produced cathode active material exhibits characteristics of charge-discharge capacity that vary depending on the type of the transition metal employed. For example, when a Fe source is used as a transition metal source, the cathode active material can be readily synthesized at low cost. However, when only Fe is used as a transition metal, the attained capacity remains at a conventionally attained value. A Mn material also leads to low-cost and easy synthesis. However, the crystal structure of lithium manganese silicate tends to break during the course of intercalation/deintercalation of Li, resulting in shorter charge-discharge cycle life. Thus, through employment of two transition metal elements (Fe and Mn); i.e., lithium iron manganese silicate ($Li_2Fe_{1-x}Mn_xSiO_4$), the above problems of low capacity and rupture of crystal structure can be solved. In the case where Fe or a similar element is used, a higher oxidation state cannot readily be attained. When two elements are used, 2-electron reaction with Li occurs, to thereby considerably increase charge-discharge capacity. From another aspect, Fe stabilizes the crystal structure. IN addition to Fe and Mn, the same is applied to Ti, Cr, V, Ni, Co, Cu, Zn, Al, Ge, Zr, Mo, and W.

Similarly, the silicate $(SiO_4)_n$ in the anion or polyanion may be partially substituted by another anion. Examples of such anion sources include titanic acid ($TiO_4$), chromic acid ($CrO_4$), vanadic acids ($VO_4$ and $V_2O_7$), zirconic acid ($ZrO_4$), molybdic acids ($MoO_4$ and $Mo_7O_{24}$), and tungstic acid ($WO_4$), which are the aforementioned transition metal acids, and phosphoric acid ($PO_4$) and boric acid ($BO_3$). Through partial substitution of polysilicate anions by any of these anion species, variation in crystal structure, which would otherwise be caused by intercalation/deintercalation of Li ions, can be suppressed, to thereby stabilize the crystal structure, whereby cycle life can be enhanced. In addition, since these substitution anionic species do not readily release oxygen even at high temperature, such cathode active materials can be used at high safety without causing burning.

(Cathode for Non-Aqueous Electrolyte Secondary Battery)

A cathode is formed by use of a cathode active material produced by pulverizing the aggregated active material obtained from heating the particulate mixture. In the production, powder of a carbon-coated or carbon deposited cathode active material is mixed with an optional conductive material such as carbon black. To the cathode active material mixture, a binder (e.g., polytetrafluoroethylene, polyvinylidene fluoride, or polyimide), a dispersant (e.g., butadiene rubber), or a thickener (e.g., carboxymethyl cellulose or a cellulose derivative) is added. The thus-obtained mixture is added to an aqueous or organic solvent, to form slurry. The slurry is applied onto one or both surfaces of a collector formed of an aluminum alloy foil having an aluminum content of 95 wt. % or higher, and the stacked structure is baked, to thereby remove the solvent and solidify the coating, to thereby yield a cathode falling within the scope of the present invention.

In the production procedure, in order to enhance slurry applicability, adhesion between the collector and the active material, and collecting performance, secondary particles which have been formed via granulation by use of the aforementioned cathode active material, a carbon source, and other material through spray drying and baking the granules may be added to the slurry, instead of the aforementioned active material. The thus-formed secondary particles assume the form of aggregated particles having a size of about 0.5 to about 20 μm. By virtue of the secondary particles, slurry applicability is drastically enhanced, whereby the cell characteristics and cell life can be further enhanced. The slurry which is subjected to spray drying may be aqueous slurry or non-aqueous slurry.

In the aforementioned cathode produced by applying the slurry containing the cathode active material on the collector formed of an aluminum alloy foil or the like, the surface, on which the active material layer will be formed, of the collector preferably has a surface roughness Rz, which is a ten-point height of irregularities defined by JIS B 0601-1994, of 0.5 μm or more. Such a surface roughness provides excellent adhesion between the formed active material layer and the collector. As a result, electron conductivity during intercalation/deintercalation of Li ions and collection performance to the collector can be enhanced, whereby the charge-discharge cycle life is prolonged.

When the interface between the collector and the cathode active material layer formed on the collector includes a hybrid interface region in which at least a predominant component diffuses into the cathode active material layer, joining between the collector and the active material is enhanced, and variation in volume and crystal structure during charge-discharge cycles can be more effectively prevented, whereby the cycle life is prolonged. When the collector surface roughness falls within the aforementioned range, these properties are more enhanced.

(Non-Aqueous Electrolyte Secondary Battery)

A high-capacity secondary battery employing the cathode of the present invention may be produced from members such as anodes using known anode active materials, an electrolyte, a separator, a cell casing, etc. without any particular limitation.

The secondary battery having the cathode of the present invention exhibits high capacity and excellent electrode characteristics. However, when a fluorine-containing non-aqueous solvent is used as an electrolyte of the secondary battery or added to the electrolyte, a drop in capacity is prevented even after repetition of charge-discharge cycles, thereby prolonging cell life. Specifically, particularly when an anode containing a high-capacity silicon-based anode active material is employed, preferably used is an electrolyte containing fluorine or an electrolyte containing a non-aqueous solvent having fluorine atoms as substituents, in order to prevent considerable expansion/contraction which would otherwise be caused by intercalation/deintercalation of Li ions. Since the fluorine-containing solvent can relax volume expansion of a silicon-containing coating which would otherwise be caused by alloying with Li ions during charging (particularly the initial charging process), a drop in capacity which would otherwise be caused by a charge-discharge process can be prevented. The fluorine-containing non-aqueous solvent which may be used in the invention is ethylene carbonate fluoride, fluorinated linear carbonate, etc. An example of ethylene carbonate fluoride is mono-tetrafluoroethylene carbonate (4-fluoro-1,3-dioxolan-2-one, FEC), and examples of the fluorinated linear carbonate include methyl 2,2,2-trifluoroethyl carbonate and ethyl 2,2,2-trifluoroethyl carbonate. These fluorine compounds may be added singly or in combination to the electrolyte. One conceivable mechanism is that strong bonding between fluorine and silicon stabilizes the coating layer, to thereby suppress expansion of the coating layer which would otherwise be caused by alloying with Li ions during charging.

(Effects of the Present Invention)

The cathode active material of the present invention for a secondary battery contains nano-scale crystals or primary particles not to have been conventionally existed and to have low crystallinity. This, short conduction paths for Li ions and electrons are provided, to thereby attain excellent ion conductivity and electron conductivity. Therefore, high capacity, which a silicate-based lithium transition metal compound intrinsically possesses, can be attained upon charge and discharge.

The aforementioned secondary battery of the present invention having the cathode formed of the cathode active material employs a lithium transition metal silicate compound intrinsically having a large specific capacity and realizes charge and discharge at room temperature, which has not conventionally been achieved, whereby excellent electrode characteristics can be attained. Thus, the non-aqueous electrolyte secondary battery employing the cathode active material of the present invention will realize a secondary battery employing a lithium transition metal silicate compound which is expected to provide such a high capacity as conventionally not attained. Such a high-capacity secondary battery can be used in a power source of mobile electronic devices, electric tools, electric vehicles, etc.

EXAMPLES

The present invention will next be described in detail by way of examples, which should not be construed as limiting the invention thereto.

In the following Examples, a lithium iron manganese silicate compound was synthesized. However, the same procedure may be employed for synthesizing or providing similar silicate compounds containing other transition metal or containing another anion.

(1) Synthesis of Particulate Mixture

Firstly, particulate mixtures for producing lithium transition metal silicate cathode active materials for testing as well as active materials were produced through the following procedure.

(1-1) Synthesis Example 1

An apparatus for producing a particulate mixture through a flame method was employed. The apparatus had a reactor having, at the center thereof, a silica rod on which the formed particulate mixture was deposited; a plurality of burners for supplying flame source gases (oxygen and hydrogen) and raw material gases to the surface of the rod, the burners being disposed around the rod; and a discharge tube for discharging non-deposited formed microparticles and reaction products such as hydrochloric acid. The following raw material gases were supplied under the following supply conditions (composition: $Li_2Mn_{1-x}Fe_xSiO_4$, target X=0.9):

$H_2$: 5 dm$^3$/min,
$O_2$: 5 dm$^3$/min,
LiCl (4M aq. solution): 0.2 dm$^3$/min,
$FeCl_2 \cdot 4H_2O$ (1M aq. solution): 0.09 dm$^3$/min,
$MnCl_2 \cdot 4H_2O$ (1M aq. solution): 0.01 dm$^3$/min, and
$SiCl_4$: 0.1 dm$^3$/min.

Separately, $N_2$ was supplied to the reactor at a specific flow rate, to thereby convert the atmosphere thereof to inert gas. Under such conditions, a particulate mixture serving as a cathode active material precursor was synthesized in the flame provided by the burners and deposited around the rod, the particulate mixture containing silica microparticles, transition metal oxide such as iron oxide or manganese oxide, microparticles, and lithium iron manganese silicate compound microparticles. While the rod was rotated and pulled up, the particulate mixture was uniformly deposited on the surface of the rod at a uniform thickness. The thus-deposited particulate mixture was scraped off from the rod and recovered. In order to further remove impurities and regulate the particle size, the recovered particulate mixture was passed through a filter, to thereby yield particulate mixture.

(1-2) Synthesis Example 2

The same flame method was employed for the following raw material liquids with the following concentrations to be supplied to a propane combustion flame obtained from air and propane gas, for thermal oxidation method, to thereby synthesize and recover particulate mixture b (composition: $Li_2Mn_{1-x}Fe_xSiO_4$, target X=0.1):

Lithium naphthenate (4M solution): 0.2 dm$^3$/min,
$C_{16}H_{30}FeO_4$ (2-ethylhexane iron II) (1M solution): 0.01 dm$^3$/min, $C_{16}H_{30}MnO_4$ (2-ethylhexane Mn II) (1M solution): 0.09 dm³/min, and $C_8H_{24}O_4Si_4$ (octamethylcyclotetrasiloxane) (1M solution): 0.1 dm³/min.

(1-3) Synthesis Example 3

In Synthesis Example 3, active material r was produced. Specifically, the following raw materials were fed to a pressure container having an inner cylinder made of polytetrafluoroethylene, and the pressure container was placed in an autoclave, where the mixture was allowed to react at 170° C. for 18 hours (hydrothermal synthesis) (composition: $Li_2Mn_{1-x}Fe_xSiO_4$, target X=0.5):

LiOH.H₂O: 0.2 mol,
FeCl₂.4H₂O: 0.05 mol,
MnCl₂.4H₂O: 0.05 mol, and
SiO₂ microparticles (powder): 0.1 mol.

Separately, a solution of L-ascorbic acid (micro-amount (about 0.01 mol) in ion-exchange water was added to the reaction product so that the total volume was adjusted to 0.5 dm³. The mixture was cooled to room temperature, and the precipitated matter was recovered. The product was sufficiently washed with pure water and then dried under vacuum at 70° C. for 2 hours, to thereby yield active material r.

(1-4) Comparative Synthetic Example 1

In Comparative Synthetic Example 1, active material s was produced. The following raw materials were mixed together and fed to an electric furnace, and the mixture was baked (i.e., solid phase synthesis) (composition: $Li_2Mn_{1-x}Fe_xSiO_4$, target X=0.9):

Li₂CO₃: 0.2 mol,
FeC₂O₄.2H₂O: 0.09 mol,
MnC₂O₄.2H₂O: 0.01 mol, and
SiO₂ microparticles (powder): 0.1 mol.

The mixture was calcined at 700° C. for 12 hours and then baked twice at 1,000° C. for 24 hours, to thereby yield active material s (solid phase synthesis).

(2) Synthesis of Aggregated Active Material and Active Material (2-1) Examples 1, 4, and 5 and Comparative Example 3

Predetermined amounts of particulate mixture a and polyvinyl alcohol were placed in a sealable container filled with N₂ gas, and the contents were heated under various conditions (heating temperature and heating time) given in Table 1, to thereby perform carbon coating or carbon deposition, whereby aggregated active materials a', a1', a2', and q' were produced. These aggregated active materials were pulverized, to thereby yield lithium iron manganese silicate compound cathode active materials A, A1, A2, and Q via the flame method (Examples 1, 4, and 5, and Comparative Example 3).

(2-2) Example 2

Separately, particulate mixture b was subjected to heating and carbon coating under the same conditions as employed in Example 1, to thereby produce an aggregated active material, which was then pulverized, to thereby yield cathode active material B.

(2-3) Example 3 and Comparative Example 1

In a manner similar to that of Example 1, a mixture of active material r and polyvinyl alcohol was heated at 650° C. for 4 hours, to thereby perform carbon coating or carbon deposition, to thereby yield cathode active materials P and R. After synthesis, tendency of particle aggregation was observed with respect to cathode active materials P and R. Thus, cathode active material P was further pulverized sufficiently by means of a mortar.

(2-4) Comparative Example 2

In a manner similar to that of Example 1, a mixture of active material s and polyvinyl alcohol was heated at 650° C. for 4 hours, to thereby perform carbon coating or carbon deposition, to thereby yield cathode active material S.

(3) Measurement and Observation of Samples (3-1) Powder X-Ray Diffractometry

The particulate mixtures and cathode active materials of the Examples and Comparative Examples were subjected to powder X-ray diffractometry (2θ: 10 to 50°) under the following conditions, to thereby determine the crystallinity, diffraction property, and diffraction angle 2θ of each microparticle sample and the crystallinity and crystal size of each cathode active material sample.

X ray: Cu Kα beam, output: 1.2 kW, apparatus: RINT 2000 (Rigaku Corporation)

(3-2) Scanning Electron Microscopic (SEM) Observation

Each of the produced aggregated active materials was observed under an SEM. The pore size of the aggregated active material after heat treatment of the particulate mixture was determined through SEM.

(3-3) Transmission Electron Microscopic (TEM) Observation

Similarly, each of the cathode active materials was analyzed through TEM along with TEM image analysis, to thereby determine the particle size distribution profile (range and number average density), particle shape, etc.

(4) Fabrication of Test Cathode Employing Active Material Sample and Secondary Battery Having the Cathode A conducting aid (carbon black) was added to each of cathode active material powder A, B, A1, A2, P, Q, R, and S, produced in the Example and the Comparative Example so as to adjust the carbon black content to 10 wt. %. The mixture was further kneaded for 5 hours by means of a ball mill having a nitrogen atmosphere therein. The powder mixture was mixed with polyvinylidene fluoride (PVdF) serving as a binder at a ratio (by weight) of 95:5. N-Methyl-2-pyrrolidone (NMP) was added thereto, followed by sufficient kneading, to thereby produce cathode slurry.

The cathode slurry was applied onto an aluminum foil collector having a thickness of 15 μm and a surface roughness Rz which is JIS B 0601-1994, ten-point height of irregularities as shown in Table 2 at a coating amount of 50 g/m². The coating was dried 120° C. for 30 minutes. Then, the coated structure was rolled by means of a press roller to a density of 2.0 g/cm³, and the resultant sheet was punched out, to thereby produce disk (2 cm²) cathodes.

A lithium secondary battery was fabricated from each cathode, an anode (metallic lithium), and an electrolyte of 1M LiPF$_6$ dissolved in a mixture of ethylene carbonate and diethyl carbonate (1:1 by vol.). The procedure was repeated, except that monotetrafluoroethylene carbonate of the electrolyte was changed to ethylene carbonate, to thereby fabricate a battery of Example 5. The battery fabrication was carried out at a dew point of −50° C. or lower. In use, each electrode was press-attached to a battery casing connected to a collector. From the aforementioned cathode, anode, electrolyte, and separator, a coin-type lithium secondary battery (diameter: 25 mm, thickness: 1.6 mm) was produced.

(5) Evaluation of Test Samples

By use of the coin-type lithium secondary battery, the cathode active material of the present invention was performed as follows.

The battery was charged to 4.5 V (vs. Li/Li$^+$) through CC-CV method at 25° C. and a current rate of 0.01C and then discharged to 1.5 V as the same as above through CC method at a current rate of 0.01C. Thus, the initial charge-discharge capacity was determined.

Tables 1 and 2 show cathode active material synthesis conditions and test results.

TABLE 1

| No. | Synth. active material ref. | Synthesis | Heat source | Raw material | Thermal treatment conditions Temp. (° C.) | Time (hr) | XRD (2θ = 5-50°) Diffraction peak half width | Crystallite size |
|---|---|---|---|---|---|---|---|---|
| Ex. 1 | A | Flame | Oxygen-hydrogen flame | Gas/chloride | 650 | 4 | 0.18-0.35 | 37-48 |
| Ex. 2 | B | Flame | Combustion flame | Liquid | 650 | 4 | 0.27-0.47 | 18-32 |
| Ex. 3 | P | Hydrothermal | — | Solid or liquid | 650 | 4 | 0.20-0.31 | 28-44 |
| Ex. 4 | A1 | Flame | Oxygen-hydrogen flame | Gas/chloride | 300 | 10 | 0.5-0.6 | 5-11 |
| Ex. 5 | A2 | Flame | Oxygen-hydrogen flame | Gas/chloride | 900 | 0.5 | 0.5-0.6 | 6-14 |
| Comp. Ex. 1 | R | Hydrothermal | — | Solid or liquid | 650 | 4 | 0.12-0.22 | 40-60 |
| Comp. Ex. 2 | S | Solid phase | — | Solid | 650 | 4 | 0.10-0.14 | 55-70 |
| Comp. Ex. 3 | Q | Flame | Oxygen-hydrogen flame | Gas/chloride | 900 | 12 | 0.14-0.17 | 48-65 |

| No. | Particle size distribution Range (nm) | Mean size (nm) | TEM/EDS Particle form | Crystallinity | Aggregated active material SEM Void size | Property |
|---|---|---|---|---|---|---|
| Ex. 1 | 50-145 | 81 | Generally spherical | Microcryst. | Mean ca. 0.3 μm | Porous |
| Ex. 2 | 30-120 | 59 | Generally spherical | Microcryst. | Mean ca. 0.2 μm | Porous |
| Ex. 3 | 40-140 | 75 | Generally spherical | Cryst. | (Microparticulate powder) | |
| Ex. 4 | 10-70 | 25 | Generally spherical-cylindrical | Microcryst. | 0.05-0.1 μm | Porous |
| Ex. 5 | 15-90 | 30 | Generally spherical-cylindrical | Microcryst. | 0.05-0.2 μm | Porous |
| Comp. Ex. 1 | 100-800 | 373 | Non-specific | Cryst. | (Particle aggregation) | |
| Comp. Ex. 2 | 110-220 | 176 | Rod-cylindrical | Cryst. | ca. 1 μm | Porous |
| Comp. Ex. 3 | 100-200 | 160 | Generally spherical-cylindrical | Cryst. | ca. 0.8 μm | Porous |

TABLE 2

| No. | Synth. active material ref. | Active material synthesis conditions | | | Thermal treatment conditions | |
|---|---|---|---|---|---|---|
| | | Synthesis | Heat source | Raw material | Temp. (° C.) | Time (hr) |
| Ex. 1 | A | Flame | Oxygen-hydrogen flame | Gas/chloride | 650 | 4 |
| Ex. 2 | B | Flame | Combustion flame | Liquid | 650 | 4 |
| Ex. 3 | P | Hydrothermal | — | Solid or liquid | 650 | 4 |
| Ex. 4 | A1 | Flame | Oxygen-hydrogen flame | Gas/chloride | 300 | 10 |
| Ex. 5 | A2 | Flame | Oxygen-hydrogen flame | Gas/chloride | 900 | 0.5 |
| Ex. 6 | A | Flame | Oxygen-hydrogen flame | Gas/chloride | 650 | 4 |
| Comp. Ex. 1 | R | Hydrothermal | — | Solid or liquid | 650 | 4 |
| Comp. Ex. 2 | S | Solid phase | — | Solid | 650 | 4 |
| Comp. Ex. 3 | Q | Flame | Oxygen-hydrogen flame | Gas/chloride | 900 | 12 |

| No. | Cathode | | | 2nd Battery room temp. characteristics | | |
|---|---|---|---|---|---|---|
| | Collector | | Active material film | | | |
| | Material | Surface roughness Rz (μm) | interface/collector component dispersion (EPMA) | Init. charge capacity (mAh/g) | Init. discharge capacity (mAh/g) | Non-aq. electrolyte |
| Ex. 1 | Al alloy foil | 0.7 | Yes | 160 | 160 | F-free |
| Ex. 2 | Al alloy foil | 0.5 | Yes | 163 | 163 | F-free |
| Ex. 3 | Al alloy foil | 0.7 | Yes | 155 | 152 | F-free |
| Ex. 4 | Al alloy foil | 1 | Yes | 115 | 110 | F-free |
| Ex. 5 | Al alloy foil | 0.7 | Yes | 105 | 100 | F-free |
| Ex. 6 | Al alloy foil | 0.7 | Yes | 165 | 165 | F-contg. |
| Comp. Ex. 1 | Al alloy foil | 0.7 | Yes | 70 | 45 | F-free |
| Comp. Ex. 2 | Al alloy foil | 0.7 | No | Unchargeable | — | F-free |
| Comp. Ex. 3 | Al alloy foil | 0.7 | Yes | 55 | 40 | F-free |

Figure 5:
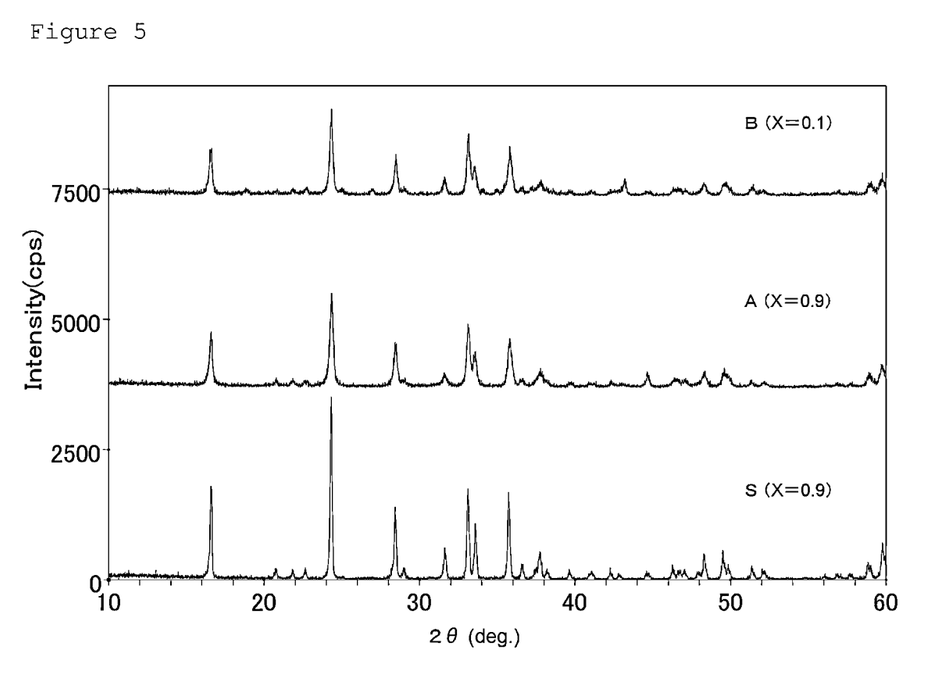
FIG. 5 XRD patterns of the cathode active materials A and B of the present invention and cathode active material S of comparative example.

FIGS. 1 and 2 show SEM images of aggregated active material a'. FIGS. 3 and 4 show SEM images of cathode active material A. FIG. 5 shows the XRD results of cathode active materials B, A, and S.

From the sample production conditions, measurements, and test results, the following was elucidated. In Examples 1, 2, 4, and 5, in which particulate mixtures were synthesized through the flame method, exhibited large charge-discharge capacity at room temperature in the initial charge-discharge test. Such a large charge-discharge capacity was larger than that obtained by use of a conventional lithium transition metal silicate material and first attained in the present invention.

Other than the flame method-based synthesis, Example 3 produced by the hydrothermal synthesis method provided characteristics falling within the scope of the present invention, except that the aggregated product had relatively high crystallinity. Thus, in Example 3, excellent charge-discharge capacity was obtained in the initial charge-discharge test.

However, in Comparative Example 1, hydrothermally synthesized particles seemed to form aggregates, which fell outside the scope of the invention. Therefore, the obtained charge-discharge capacity was small.

In Comparative Example 2 produced by solid phase material synthesis, crystal growth considerably proceeded due to high-temperature and long-period baking conditions. Thus, charging at room temperature failed to attain.

The results of Examples 1, 2, 4, and 5 produced by flame method were compared with those of Comparative Example 3 in terms of carbon coat annealing conditions. When the temperature and time of annealing fell within the scope of the specific ranges, the produced active material had characteristics falling within the scope of the invention. However, under severe annealing conditions employed in Comparative Example 3, although an amorphous, crystalline, or microcrystalline particulate mixture was successfully yielded, crystal growth excessively proceeded, whereby the obtained electrode and battery exhibited insufficient charge-discharge capacity.

In Example 6, in which a fluorine-containing non-aqueous solvent was used as an electrolyte solvent, a higher capacity was obtained as compared with Example 1 employing the same conditions except for the electrolyte solvent. Although the charge-discharge cycle must be repeated for a certain long period of time, the adverse effects of the fluorine-containing solvent, surface roughness of the cathode collector, and diffusion of collector component in hybrid interface region were not confirmed.

As is clear from FIGS. 1 and 2, aggregated active material a' is formed of a large number of aggregated particles with pores having a diameter of about 50 to about 200 nm. The mean size of a pore provided between particles was found to be about 0.3 μm.

As is clear from FIGS. 3 and 4, cathode active material A is formed of aggregated particles having a diameter of about 50 to about 100 nm. Particularly, as shown in FIG. 4, lithium transition metal silicate shown black image portions is coated with amorphous carbon.

FIG. 5 shows X-ray diffraction peaks of cathode active materials A and B synthesized through the flame method. The diffraction patterns of cathode active materials A and B exhibited relatively wide half widths, which are attributed to small crystallite size and presence of particles each formed of aggregated small crystallites. In contrast, cathode active material S, synthesized through solid phase method, exhibited sharp diffraction peaks with large diffraction intensities, indicating that active material S is formed of typically large crystallites or assumes a single crystal. Thus, cathode active material S clearly differs from cathode active materials A and B.

In Examples 7 to 18, cathode active materials were synthesized through the same methods as employed in Synthesis Example 1 and Example 1, except that the transition metal was changed or silicate was partially substituted with another anion. The compositional proportions of transition metals and anions contained in the cathode active material were determined through ICP-AES of a particulate mixture immediately after synthesis through the flame method. Also, test cathodes employing the thus-produced cathode active materials and secondary batteries were fabricated through the same method as employed in Example 1. The initial discharge capacity was determined through the same method as employed in Example 1 (i.e., 25° C., current rate: 0.01C, CC-CV method). Table 3 shows the measurement and test results of Examples 7 to 18.

TABLE 3

| | Cathode active material composition | | Initial discharge capacity |
| --- | --- | --- | --- |
| | Transition metal | Anion | (mAh/g) |
| Ex. 7 | $Fe_{0.5}Ti_{0.5}$ | $SiO_4$ | 148 |
| Ex. 8 | $Fe_{0.5}Cr_{0.5}$ | $SiO_4$ | 143 |
| Ex. 9 | $Fe_{0.5}V_{0.5}$ | $SiO_4$ | 157 |
| Ex. 10 | $Fe_{0.5}Ni_{0.5}$ | $SiO_4$ | 170 |
| Ex. 11 | $Fe_{0.5}Co_{0.5}$ | $SiO_4$ | 155 |
| Ex. 12 | $Fe_{0.5}Zn_{0.5}$ | $SiO_4$ | 126 |
| Ex. 13 | $Fe_{0.5}Al_{0.5}$ | $SiO_4$ | 120 |
| Ex. 14 | $Fe_{0.5}Ge_{0.5}$ | $SiO_4$ | 118 |
| Ex. 15 | $Fe_{0.5}Zr_{0.5}$ | $SiO_4$ | 143 |
| Ex. 16 | $Fe_{0.5}Mo_{0.5}$ | $SiO_4$ | 165 |
| Ex. 17 | $Fe_{0.5}Mn_{0.5}$ | $(SiO_4)_{0.9}(PO_4)_{0.1}$ | 161 |
| Ex. 18 | $Fe_{0.5}Mn_{0.5}$ | $(SiO_4)_{0.9}(BO_3)_{0.1}$ | 144 |

Similar to Examples 1 to 6, in which the transition metal was iron and manganese, a high initial discharge capacity was attained at room temperature in Examples 7 to 16, in which various metals like transition metals were employed. As shown in relation to Examples 17 and 18, in the present invention, the silicate of lithium transition metal silicate may be partially substituted by a non-silicate anion such as phosphate or borate.

As described hereinabove, the cathode containing the cathode active material of the present invention applied onto a specific collector can be used as a cathode exhibiting excellent charge-discharge characteristics in chargeable-dischargeable secondary batteries such as lithium ion secondary batteries employing a non-aqueous electrolyte. In the future, further improvement of the compound of the present invention will realize enhancement in charge-discharge capacity to an intrinsically high theoretical specific capacity as a target. Therefore, the present invention can impart excellent characteristics as high energy and high output which have not conventionally been attained to general electronic devices and secondary batteries which are now realized in industry and automobiles. In addition, the method of the present invention for producing a particulate mixture, in particularly the flame method-based method, is suitable for mass production and can provide such products at low cost.

DESCRIPTION OF REFERENCE NUMERALS a' . . . Aggregated active material
A . . . Cathode active material

The invention claimed is:

1. A method for producing a lithium transition metal silicate cathode active material, characterized in that the method comprises:
    supplying a lithium source, a transition metal source, a silicon source, and pure water to a reactor;
    treating the mixture at 150 to 400° C. in the sealed pressure reactor, to thereby synthesize a cathode active material;
    heating the cathode active material at 300 to 900° C. for 0.5 to 10 hours, to thereby produce an aggregated active material; and
    pulverizing the aggregated active material, to thereby produce a lithium transition metal silicate cathode active material,
    wherein the lithium transition metal silicate cathode active material exhibits diffraction peaks having half widths of 0.175 to 0.6°, the peaks being observed through powder X-ray diffractometry within a 2Θ range of 5 to 50°, or has a crystallite size of 5 to 50 nm, the crystallite size being determined through powder X-ray diffractometry within a 2Θ range of 5 to 50°.

2. The method according to claim 1, the method further comprising:
    supplying a lithium source, a transition metal source, a silicon source, and pure water into flame in a reactor, to thereby synthesize an active material precursor;
    heating the active material precursor at 300 to 900° C. for 0.5 to 10 hours, to thereby produce an aggregated active material; and
    pulverizing the aggregated active material.

3. The method according to claim 2, wherein the flame is an oxygen-hydrogen flame, and the reactor is filled with an inert gas.

4. The method according to claim 2, wherein the flame is an oxygen-containing hydrocarbon flame, and the reactor is filled with an inert gas.

5. The method according to claim 2, wherein the lithium source, the transition metal source, and the silicon source supplied into the flame is a chloride, and the source of the flame contains at least hydrogen gas and oxygen gas.

6. The method according to claim 2, wherein the lithium source, the transition metal source, and the silicon source are supplied into the flame in the gas form, or in the liquid or solution form which has been caused to pass through a vaporizer before the supply.

7. A cathode active material production method according to claim 1, wherein heating is performed in the presence of an additional carbon source in the production of the aggregated active material.

8. A cathode active material production method according to claim 1, wherein the aggregated active material is porous and has a pore size, as observed on the surface thereof, of 0.01 to 0.6 μm.

9. A method for producing a cathode for a non-aqueous electrolyte secondary battery, characterized in that the method comprises applying, onto a collector, a slurry containing a cathode active material which has been produced through a cathode active material production method as recited in claim 1.

10. A non-aqueous electrolyte secondary battery cathode production method according to claim 9, wherein the slurry contains secondary particles formed through granulation of the cathode active material and having a particle size of 0.5 to 20 μm.

* * * * *